J. W. FAY.
ART OF WELDING.
APPLICATION FILED APR. 5, 1920.

1,372,805.

Patented Mar. 29, 1921.

Inventor:
Joseph W. Fay,
By Dyrenforth, Lee, Chritton & Wiles
Att'ys

UNITED STATES PATENT OFFICE.

JOSEPH W. FAY, OF MILWAUKEE, WISCONSIN, ASSIGNOR OF ONE-HALF TO HARRY G. NYE.

ART OF WELDING.

1,372,805. Specification of Letters Patent. Patented Mar. 29, 1921.

Application filed April 5, 1920. Serial No. 371,228.

*To all whom it may concern:*

Be it known that I, JOSEPH W. FAY, a citizen of the United States, residing at 715 Farwell Ave., Milwaukee, in the county of Milwaukee and State of Wisconsin, have invented a new and useful Improvement in the Art of Welding, of which the following is a specification.

In welding metal parts in accordance with the present invention, the edges to be welded together are spaced apart at all points, the space between them being usually of substantial width as compared with the thickness of the parts at their edges and weld metal is supplied between them in fused state while a welding heat is supplied. Welding of parts of substantial thickness may be strongly and easily effected by the present method, particularly in the case of heavy gage material.

Figure 1:
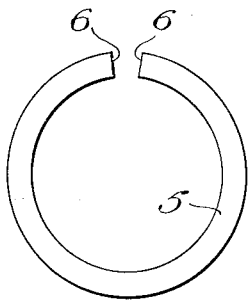
Figure 2:
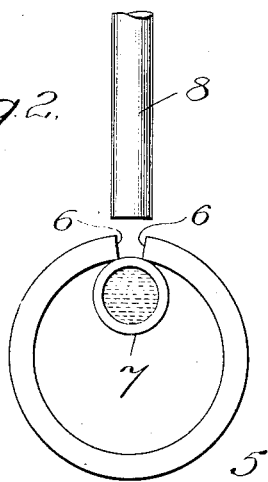
Figure 3:
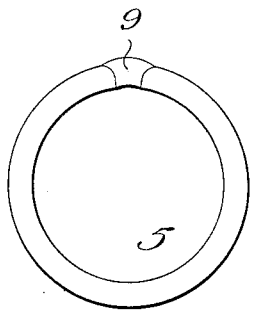

In the drawings, Figure 1 shows a rolled tube or housing, the edges of which are to be welded together; Fig. 2 shows diagrammatically the position of the parts during the welding operation and Fig. 3 shows the product with the welded joint.

The edges 6, 6 of the rolled steel or iron tube 5 which are to be welded are spaced apart until a gap is formed between them, which may be of substantial width as compared with the thickness of the metal at the edges; e. g., 1/16 to 1/8 inch gap for 1/8 inch metal, 1/4 inch or wider gap for metal 1/8 to 1/2 inch thick. To retain the gap the opening may be initially spread wider than the final space desired, or suitable spacers may be inserted in it to prevent closing of the gap. A chill 7 is placed against the metal directly below the edges to be welded together and an arc formed between the metal and the electrode 8, which may be formed of soft iron which is fused and deposited in the gap while the heat of the electrode effects a thorough weld with the edges 6, 6. A carbon electrode may be utilized instead and the weld metal deposited by fusions of a filler if desired. In the resulting weld, as shown in Fig. 3, the deposited weld metal is indicated by numeral 9; the lines of the weld which, for purposes of illustration are indicated as of clearly defined character, diverging from the bottom of the weld to the top to a greater extent than did the edges of the original gap. By the use of the present process in the welding of thick or heavy gage metal, say over 1/8 inch thick, a complete union or welding is secured for the entire depth of the weld.

What I claim as new and desire to secure by Letters Patent is:

1. The process of forming a tube from a rolled sheet or ribbon which consists in spreading apart the meeting edges of the said sheet or ribbon until separated by a gap of substantial thickness as compared with the thickness of the metal and supplying weld metal therebetween while maintaining a welding temperature by means of an arc.

2. The process of forming a welded joint between metal parts which consists in completely separating said metal parts and supplying weld metal therebetween while maintaining a welding temperature by means of an electric arc.

3. The process of forming a welded joint between iron parts which consists in separating the edges to be welded to form a gap therebetween of substantial width as compared with the thickness of the parts and supplying weld metal therebetween while maintaining a welding temperature by means of an arc.

4. A welded joint consisting of metal parts having their edges spaced apart from top to bottom and weld metal deposits therebetween and united therewith, the line of union diverging from bottom to top.

5. A welded joint consisting of ferrous metal parts having their edges apart from top to bottom of the joint and weld iron deposited therebetween and united therewith the lines of union diverging from bottom to top.

6. A tube consisting of a ferrous metal sheet or ribbon rolled into tube-like form, the edges being separated by a gap of substantial width as compared with the thickness of the sheet, and weld iron deposited therebetween and united therewith, the lines of union diverging from bottom to top.

JOSEPH W. FAY.